United States Patent
Updyke

(10) Patent No.: US 12,331,798 B1
(45) Date of Patent: Jun. 17, 2025

(54) SPRING AND DAMPER ASSEMBLY FOR A CENTRIFUGAL CLUTCH IN A CONTINUOUSLY VARIABLE TRANSMISSION

(71) Applicant: The Hilliard Corporation, Elmira, NY (US)

(72) Inventor: John R. Updyke, Big Flats, NY (US)

(73) Assignee: The Hilliard Corporation, Elmira, NY (US)

( * ) Notice: Subject to any disclaimer, the term of this patent is extended or adjusted under 35 U.S.C. 154(b) by 0 days.

(21) Appl. No.: 18/983,536

(22) Filed: Dec. 17, 2024

Related U.S. Application Data

(60) Provisional application No. 63/611,817, filed on Dec. 19, 2023.

(51) Int. Cl.
    *F16D 43/18*      (2006.01)

(52) U.S. Cl.
    CPC ...... *F16D 43/18* (2013.01); *F16D 2200/0034* (2013.01); *F16D 2200/0056* (2013.01); *F16D 2300/22* (2013.01)

(58) Field of Classification Search
    CPC .......... F16D 13/16; F16D 43/14; F16D 43/18; F16D 2200/034; F16D 2200/0056; F16D 2300/22
See application file for complete search history.

(56) References Cited

U.S. PATENT DOCUMENTS

| | | | | |
|---|---|---|---|---|
| 3,565,224 A | * | 2/1971 | Argereu | F16D 43/18 |
| | | | | 192/105 BA |
| 3,693,771 A | * | 9/1972 | De Lancey | F16D 43/18 |
| | | | | 192/75 |
| 6,857,515 B2 | | 2/2005 | Barron et al. | |
| 7,717,250 B2 | | 5/2010 | Barron et al. | |
| 8,651,986 B2 | | 2/2014 | Ochab et al. | |
| 2007/0095629 A1 | * | 5/2007 | Ishikawa | F16D 43/18 |
| | | | | 192/105 CD |
| 2012/0298465 A1 | * | 11/2012 | Ochab | F16D 43/18 |
| | | | | 192/76 |
| 2013/0020170 A1 | * | 1/2013 | Kataoka | F16D 43/18 |
| | | | | 192/103 B |

FOREIGN PATENT DOCUMENTS

EP      1544435 A1 * 6/2005 ............ F02B 67/06

* cited by examiner

*Primary Examiner* — Lori Wu
(74) *Attorney, Agent, or Firm* — Faegre Drinker Biddle & Reath LLP

(57) ABSTRACT

A spring and damper assembly for a centrifugal clutch for a CVT, the CVT having a clutch hub rotatably located within a drum and a plurality of clutch shoes slidingly disposed within the clutch hub. Each shoe includes a spring cavity, the spring and damper assembly being located within the spring cavity. The spring and damper assembly includes a spring disposed within the spring cavity and a spring retainer located within the spring cavity and positioned against one end of the spring. The spring retainer is engaged with the clutch hub and configured to locate the spring within the spring cavity. A dampener is located within the spring. The dampener is made from a material configured to reduce motion of the spring.

20 Claims, 3 Drawing Sheets

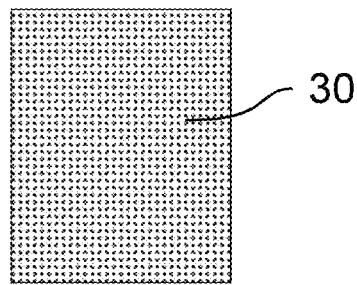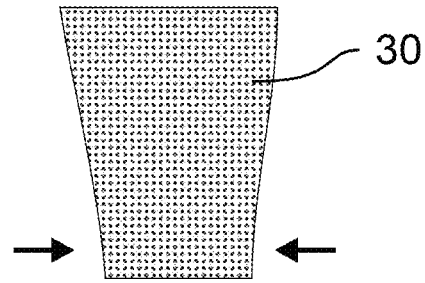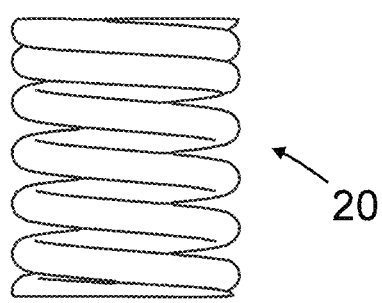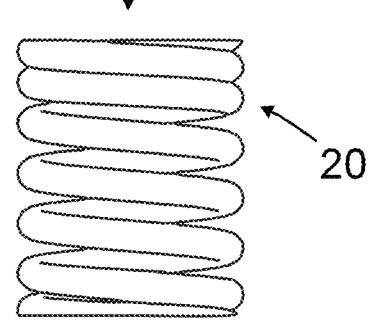
FIG. 2A
FIG. 2B
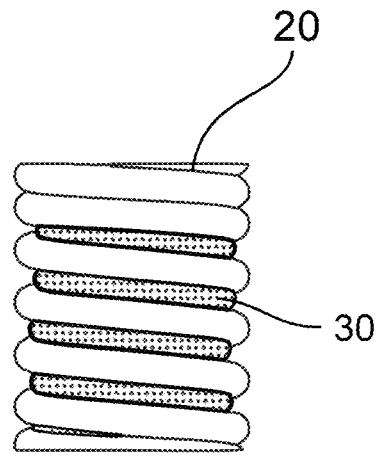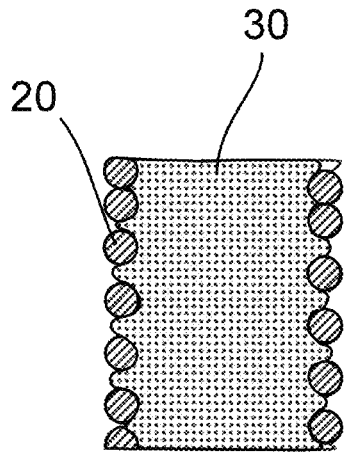
FIG. 3
FIG. 3A

SPRING AND DAMPER ASSEMBLY FOR A CENTRIFUGAL CLUTCH IN A CONTINUOUSLY VARIABLE TRANSMISSION

RELATED APPLICATION

The present application claims priority to U.S. Provisional Application No. 63/611,817 filed on Dec. 19, 2023, the disclosure of which is incorporated herein by reference in its entirety.

FIELD OF THE DISCLOSURE

The present invention relates to a spring and damper assembly for reducing the vibration characteristics of the spring in a centrifugal clutch.

BACKGROUND OF THE DISCLOSURE

A conventional continuously variable transmission (CVT) is used to enhance smooth power delivery by optimizing gear ratios based on different load conditions. CVTs include a primary clutch (sometimes referred to as a drive clutch) and a secondary clutch (sometimes referred to as a driven clutch). The primary clutch may connect to the engine and engage a drive belt, where the radial position of the belt on the primary clutch depends on the speed of the engine. The drive belt engages with the secondary clutch which may be connected to a transmission. The radial position of the belt on the secondary clutch adjusts to maintain optimal gear ratios. U.S. Pat. No. 8,651,986 discloses one primary clutch design sold by The Hilliard Corporation, the assignee of the present invention. U.S. Pat. No. 8,651,986 is incorporated herein by reference in its entirety. In that design, the primary clutch includes two centrifugal clutches as a means of providing belt protection (i.e., to prevent belt scrubbing). The centrifugal clutches utilize springs to provide engagement of clutch shoes with a drum. The Applicant has determined that in some applications the clutch design may experience spring failure due to excessive vibrations. There is, therefore, a need for a spring and damper assembly that can better withstand the continuous wear from operating a CVT.

SUMMARY OF THE DISCLOSURE

A spring and damper assembly for a centrifugal clutch in a continuously variable transmission is disclosed. The centrifugal clutch includes a clutch hub rotatably located within a drum. A plurality of clutch shoes are slidingly disposed within the clutch hub and configured to slide radially from an inward position to an outward position upon application of a centrifugal force above a threshold level. The clutch shoes are configured to contact an interior surface of the drum at the outward position. Each shoe includes a spring cavity. The spring and damper assembly being located within the spring cavity.

The spring and damper assembly includes a spring disposed within the spring cavity, and a spring retainer located within the spring cavity and positioned against one end of the spring. The spring retainer is engaged with the clutch hub and configured to locate the spring within the spring cavity. A dampener is located within the spring and configured to reduce motion of the spring.

The spring retainer may include a protrusion on one side that extends toward and into an inner diameter of the spring for locating the spring relative to the protrusion and/or on the spring retainer.

A centrifugal clutch for a continuously variable transmission is also disclosed. The centrifugal clutch includes a clutch hub rotatably located within a drum, and a plurality of clutch shoes slidingly disposed within the clutch hub and configured to slide radially from an inward position to a radially outward position upon application of a centrifugal force above a threshold level. The clutch shoes are arranged to contact an interior surface of the drum at the outward position. Each clutch shoe includes a spring cavity.

A spring and damper assembly is located within each spring cavity. The spring and damper assembly includes a spring having two opposed ends and a spring retainer located within the spring cavity and positioned against one of the ends of the spring. The spring retainer is engaged with the clutch hub and configured to locate the spring within the spring cavity. A dampener is located within the spring, the dampener is configured to reduce motion of the spring.

The dampener may be made from an elastomer material, for example a rubber or a silicone-based material.

The dampener preferably has an outer diameter that is less than or equal to an inner diameter of the spring. In one embodiment the dampener has an outer diameter that is between about 0.1% and about 5% less than the inner diameter the spring. In another embodiment the spacing between the outer diameter of the dampener and the inner diameter of the spring is between about 0.001 and about 0.004 inches.

In an embodiment, the dampener has a length that is less than an installed length of the spring and greater than about one-half of the installed length of the spring.

In an embodiment the dampener may be made from a foam material, such as a foam selected from a group consisting of a viscoelastic polyurethane, a polyvinyl chloride foam, a low resilience polyurethane foam, and an open cell foam.

It is to be understood that both the foregoing general description and the following detailed description are exemplary and explanatory and are intended to provide further explanation of the invention as claimed.

BRIEF DESCRIPTIONS OF THE DRAWINGS

The foregoing aspects and many of the intended advantages of this invention will become more readily appreciated as the same becomes better understood by reference to the following detailed description when taken in conjunction with the accompanying drawings.

FIG. 2A is a front view of an embodiment of the foam dampener and spring prior to assembly.

FIG. 2B is a front view of the foam dampener being compressed and inserted into the spring.

FIG. 3 is a front view of the foam dampener inside the spring and expanded between the spring coils.

FIG. 3A is a cross section view of the foam dampener and spring assembly of FIG. 3 taken along lines 3A-3A in FIG. 3.

Figure 1:
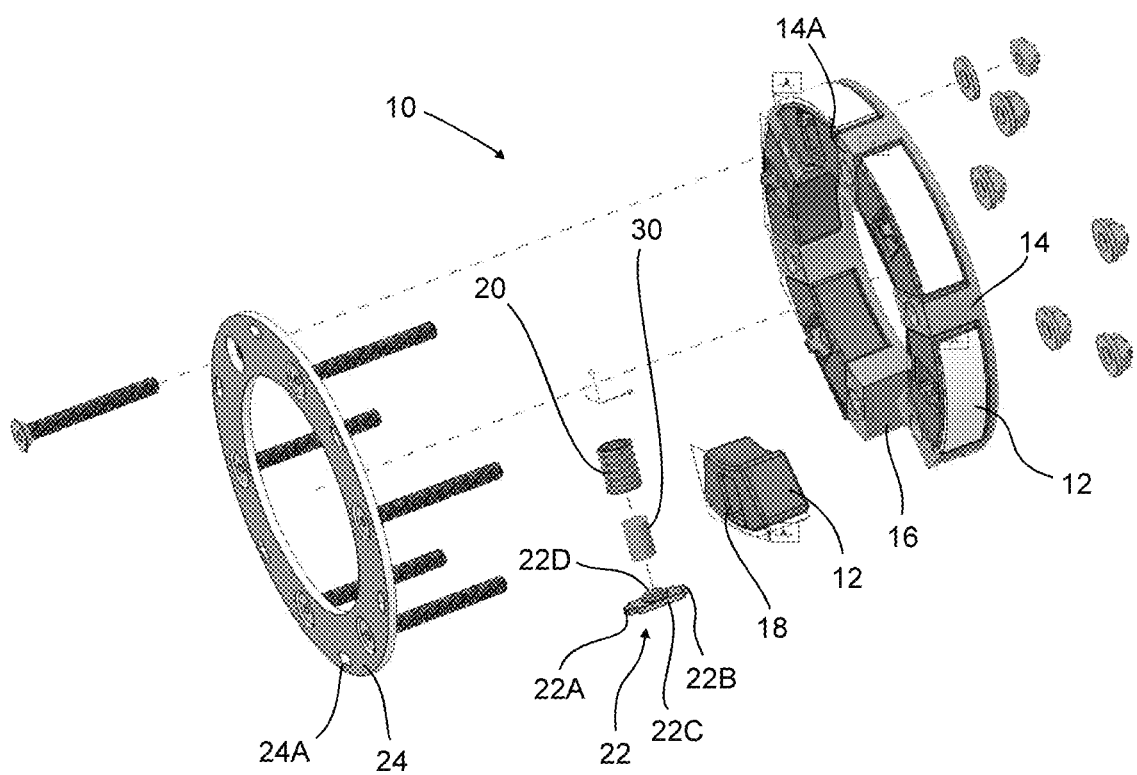
FIG. 1 is an exploded view of the centrifugal clutch including a spring and damper assembly according to the present invention.

Corresponding reference characters indicate corresponding parts throughout the several views. Although the drawings represent embodiments of various features and components according to the present disclosure, the drawings are not necessarily to scale and certain features may be exaggerated in order to better illustrate and explain the present disclosure. The exemplification set out herein illustrates an embodiment of the invention, and such an exemplification is not to be construed as limiting the scope of the invention in any manner.

DETAILED DESCRIPTION OF THE DRAWINGS

For the purposes of promoting an understanding of the principals of the invention, reference will now be made to the embodiments illustrated in the drawings, which are described below. The embodiments disclosed below are not intended to be exhaustive or limit the invention to the precise form disclosed in the following detailed description. Rather, the embodiments are chosen and described so that those skilled in the art may utilize their teachings. It will be understood that no limitation of the scope of the invention is thereby intended. The invention includes any alterations and further modifications of the illustrative devices and described methods and further applications of the principles of the invention which would normally occur to one skilled in the art to which the invention relates.

In this design of a centrifugal clutch, instead of a moveable sheave sliding axially toward a stationary sheave to engage a belt and begin transmitting torque to a secondary clutch, the sheaves are in constant contact with the belt. The sheaves house or include a drum that is part of the centrifugal clutch. Suitable centrifugal clutches are described in U.S. Pat. Nos. 6,857,515 and 7,717,250, which are incorporated herein by reference in their entirety. The drum may be a separate component or may be formed integral with each sheave.

As shown in FIG. 1, the centrifugal clutch 10 includes a plurality of clutch shoes 12 that are slidingly disposed in a clutch hub 14. The clutch hub 14 includes a plurality of pockets 16, each preferably containing at least one shoe 12. The shoes 12 are configured to slide radially in the pockets 16 between an inward position and an outward position based on the applied centrifugal loads. That is, as the centrifugal force increases, the shoes 12 slide radially outward. In order to bias the shoes inward, each shoe 12 includes a recess or spring cavity 18 in which at least one spring 20 is located. A spring retainer 22 holds the spring 20 in place in the spring cavity 18. The spring retainers 22 include tabs 22A, 22B that extend laterally from a center section 22C. One tab 22A engages with a slot 24A in a shoe retaining plate 24 that is removably attached to one side 14A of the clutch hub 14. The other tab 22B engages with a slot 14C formed in the opposite side 14B of the clutch hub 14. The retaining plate 22 secures the spring 20 in the spring cavity 18.

The centrifugal clutches 10 are designed to allow the engine to idle without transmitting torque to the sheaves. As the engine speed is increased, the shoes 12 in the centrifugal clutches 10 slide radially outward (by centrifugal force) and engage a drum (not shown) that surrounds the shoes 12 in each clutch 10. The engagement transmits torque from the drive shaft to the stationary and moveable sheaves. Since the sheaves are in contact with the belt, they transmit torque to the belt and, from there, the secondary clutch.

In some applications, for example, a vehicle application using a 1000 cc gasoline engine, the clutch design may experience some spring failures. The Applicant has determined the that failures are the result of abrasive wear due to external vibrations that are induced when the engine was running. The springs 20 were determined to be vibrating in contact with the adjacent surfaces and components in the spring cavity 18 that houses the spring. Over time, the vibrations would cause enough abrasive wear in the spring wire to produce spring failure.

In order to prevent contact with the adjacent components, a dimple 22D is incorporated in the center section 22C of the spring retainer 22. The dimple is sized to protrude into the inner diameter of the spring 20, thereby centering the spring within the cavity 18 of the shoe 12 and reducing contact between the spring and the adjacent cavity 18 walls. This helps to reduce the wearing of the spring wire.

This solution, while reducing spring wear due to contact, did not eliminate spring failures. Instead, it reduced the number of operational hours of the spring. It was determined that the dimpled spring retainer, while properly locating the spring, was constraining the ends of the spring. As a consequence, the engine vibrations were causing the middle of the spring body to oscillate. This created a combined bending and torsional load in the spring wire, eventually resulting in a fatigue failure of the spring wire.

To address this issue, the spring assembly includes a solution which dampens the vibration so as to prevent the oscillations from loading to failure of the spring. In one embodiment, a dampener or insert 30 is incorporated into the spring 20. In an embodiment, the damper 30 is a foam dampener 30 preferably made from a memory foam that compresses under load and returns to its original form when the load is removed, such as, such as a viscoelastic polyurethane, polyvinyl chloride foam, low resilience polyurethane foam, or open cell foam. For example, a resilient plasticized polymeric foam (memory foam) similar to the memory foam used in conventional ear plugs may be used. The foam dampener 30 is formed as a cylinder with a diameter preferably slightly larger than the inner diameter of the spring 20 and a height the same size as the spring 20. See, FIG. 2A. For example, in one embodiment, the spring 20 is made from 17-7 PH stainless steel and has a free (undeflected) height of approximately 0.440 inches, an outer diameter of approximately 0.360 inches, a coil diameter of approximately 0.049 inches, a spring rate of approximately 79.0 lb./in., a total of approximately 5.3 coils, of which approximately 3.3 coils are active coils, a minimum compressed length of approximately 0.265 inches max and a compressed load of approximately 10 lbs. at an approximate 0.319 inch length. The spring 20 has an inner diameter of approximately 0.262 inches. The foam dampener 30 has a height of about 0.440 inches and an outer diameter of about 0.313 inches if memory foam is used. If the foam dampener 30 has a diameter that is larger than the inner diameter of the spring 20, the foam dampener 30 is compressed and inserted into the inner diameter of the spring 20. See, FIG. 2B. The foam dampener 30's memory properties cause it to expand, causing it to both contact the spring coils and expand between the spring coils. See, FIGS. 3 and 3A. The foam dampener 30 functions to dampen the vibration of the spring 20 while not materially affecting the spring rate or changing the engaging speed of the centrifugal clutch. As a result the performance characteristics of the CVT do not change and the spring failures are eliminated.

Figure 4:
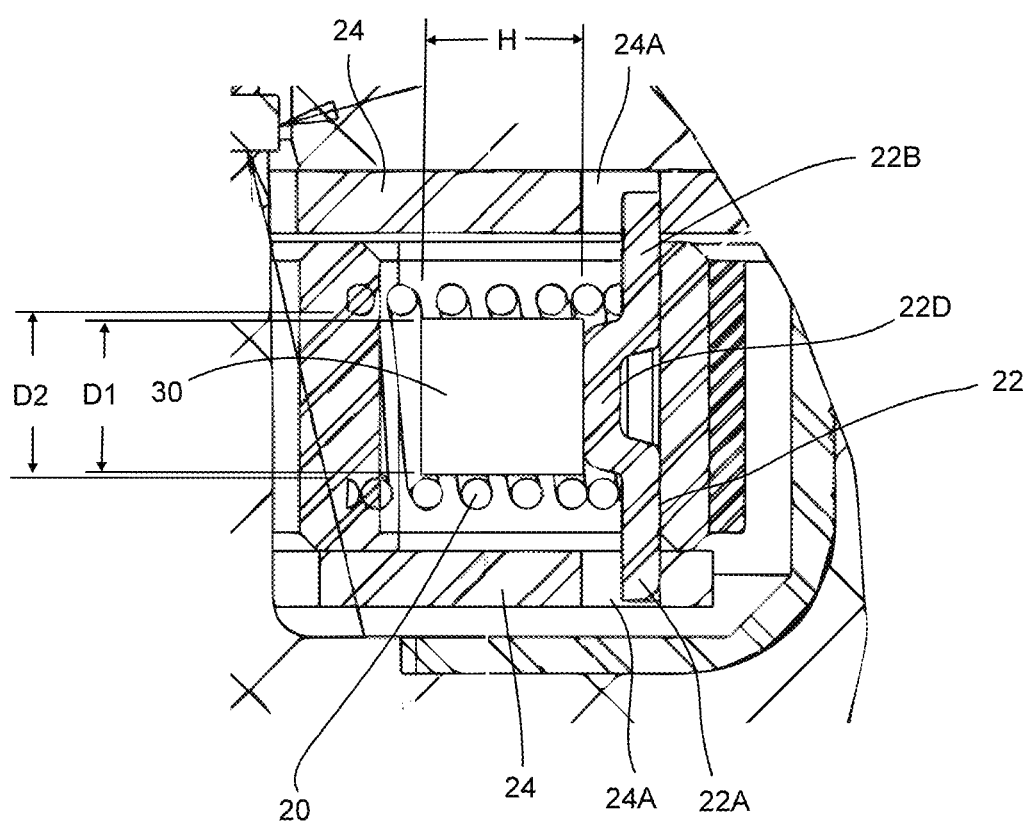
FIG. 4 is a cross sectional view of a portion of a centrifugal clutch illustrating an embodiment of the spring and damper assembly mounted within a clutch shoe.

For ease of manufacturing and assembly, in another embodiment of the present invention, the dampener 30 may be a rod made from elastomer material, such as a rubber material, e.g., buna rubber, or a silicone, such as a silicone rod. These materials can easily be cut to the desired length and installed inside the spring body with greater ease of assembly. In this embodiment, which is shown in FIG. 4, the outer diameter D1 of the dampener 30 is preferably slightly less than the inner diameter D2 of the spring 20. For example, in one configuration the spring 20 has an inner diameter D2 of approximately 0.262 inches. The dampener 30 is made from silicone and has a height H of about 0.26 inches and an outer diameter D1 of about 0.25 inches. Thus, it is easily inserted into the interior of the spring 20. The close tolerance between the inner diameter D2 of the spring 20 and the outer diameter D1 of the dampener 30 limits the lateral displacement of the spring 20 (i.e., motion perpendicular to the axis of the spring) as it is compressed.

More specifically, in the embodiment shown in FIG. 4, the inner diameter D2 of the spring 20 is slightly larger than the outer diameter D1 of the dampener 30. During use, since the spring 20 is constrained at its ends, the higher vibrations that are induced in the spring by the repetitive motion of the clutch occur at the center of the spring. When the spring 30 vibrates, the amplitude of vibration in the lateral direction of these center coils (i.e., the movement toward and away from the dampener 30 (perpendicular to the axis of the spring)) is higher than at its ends. By locating the dampener 30 inside the spring 20 with a radial spacing from the inner diameter D2 of the center coils that is less than the anticipated amplitude of vibration of those coils during use, those spring coils will contact the dampener as they vibrate. Since the dampener 30 is softer than the spring wire 20, the dampener 30 absorbs the impact of the spring. This results in a dampening of the spring vibration, thereby eliminating the potential of a harmonic that would accentuate the spring movement and increase stress on the spring resulting in spring failure.

Thus, the spacing between the outer diameter D1 of the dampener and the inner diameter D2 of the spring is selected to be less than the average amplitude of vibration of the center coils of the spring during normal operation of the clutch. In one embodiment, the outer diameter D2 of the dampener 30 is less than or equal to the inner diameter D1 of the spring 20. In an embodiment, the outer diameter D1 of the dampener 20 is between about 0.1% to about 5% less than the inner diameter D2 of the spring 20. In an embodiment, the spacing between the outer diameter D1 of the dampener 20 and the inner diameter D2 of the spring 20 is between about 0.001 inches and about 0.004 inches.

In an embodiment, the length of the dampener 30 is also selected to be less than the installed height (length) of the spring 20 so that the dampener 30 does not affect the spring rate which could change the centrifugal clutch engagement speed. However, the length of the dampener 30 is greater than about one-half of the installed height (length) of the spring 20 so that a portion of the dampener 30 is in a position adjacent to the center coils of the spring 20 to provide the dampening effect discussed above. As such, the dampener 30 is free to move within the spring 20.

The present dampener 30 limits the movement of the spring 20 in a direction perpendicular to the axis of the spring, thus restricting movement of the spring during operation. By effectively reducing excessive movement, the springs experience less stress and therefore less spring failure.

Although FIG. 3 illustrates the foam dampener with an outer diameter that is larger than the inner diameter of the spring, the foam dampener outer diameter could be less than the inner diameter of the spring as describe above with respect to the embodiment of FIG. 4. Similarly, the height of the foam dampener could be similar in length relative to the spring as described above with respect to FIG. 4.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The particular implementations shown and described herein are illustrative examples of the invention and are not intended to otherwise limit the scope of the invention in any way. The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those skilled in this art without departing from the spirit and scope of the invention.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening.

The recitation of ranges of values herein are merely intended to serve as a shorthand method of referring individually to each separate value falling within the range, unless otherwise indicated herein, and each separate value is incorporated into the specification as if it were individually recited herein.

Terms such as "about" or "approximately", unless otherwise defined or restricted in the specification, should be understood to define a variance of plus or minus 5%-10% to the numerical term referred to.

All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not impose a limitation on the scope of the invention unless otherwise claimed. The various embodiments and elements can be interchanged or combined in any suitable manner as necessary.

The use of directions, such as forward, rearward, top and bottom, upper and lower are with reference to the embodiments shown in the drawings and, thus, should not be taken as restrictive. Reversing or flipping the embodiments in the drawings would, of course, result in consistent reversal or flipping of the terminology.

No language in the specification should be construed as indicating any non-claimed element as essential to the practice of the invention.

It will be apparent to those skilled in the art that various modifications and variations can be made to the present invention without departing from the spirit and scope of the invention. There is no intention to limit the invention to the specific form or forms disclosed, but on the contrary, the intention is to cover all modifications, alternative constructions, and equivalents falling within the spirit and scope of the invention, as defined in the appended claims. Thus, it is intended that the present invention cover the modifications and variations of this invention provided they come within the scope of the appended claims and their equivalent.

What is claimed:

1. A spring and damper assembly for a centrifugal clutch for a continuously variable transmission, the centrifugal clutch including:
   a clutch hub rotatably located within a drum,
   a plurality of clutch shoes slidingly disposed within the clutch hub and configured to slide radially from an inward position to a radially outward position upon application of a centrifugal force above a threshold level, the clutch shoes configured to contact an interior surface of the drum at the outward position, each shoe including a spring cavity, the spring and damper assembly being located within the spring cavity,
   the spring and damper assembly comprising:
   a spring disposed within the spring cavity;
   a spring retainer located within the spring cavity and positioned against one end of the spring, the spring retainer engaged with the clutch hub and configured to locate the spring within the spring cavity; and
   a dampener located within the spring, the dampener being made from a material configured to reduce motion of the spring.

2. The spring and damper assembly of claim 1, wherein the spring retainer includes a protrusion that extends toward and into an inner diameter of the spring for locating the spring relative to the protrusion.

3. The spring and damper assembly of claim 1, wherein the dampener comprises an elastomer material.

4. The spring and damper assembly of claim 3, wherein the elastomer is a rubber or a silicone-based material.

5. The spring and damper assembly of claim 3, wherein the dampener has an outer diameter that is less than or equal to an inner diameter of the spring.

6. The spring and damper assembly of claim 5, wherein the dampener has an outer diameter that is between about 0.1% and about 5% less than the inner diameter the spring.

7. The spring and damper assembly of claim 5, wherein the spacing between the outer diameter of the dampener and the inner diameter of the spring is between about 0.001 and about 0.004 inches.

8. The spring and damper assembly of claim 3, wherein the dampener has a length that is less than an installed length of the spring and greater than about one-half of the installed length of the spring.

9. The spring and damper assembly of claim 1, wherein the dampener comprises a foam material.

10. The spring and damper assembly of claim 9, wherein the foam material is selected from a group consisting of a viscoelastic polyurethane, a polyvinyl chloride foam, a low resilience polyurethane foam, and an open cell foam.

11. A centrifugal clutch for a continuously variable transmission, the centrifugal clutch comprising:
    a clutch hub rotatably located within a drum;
    a plurality of clutch shoes slidingly disposed within the clutch hub and configured to slide radially from an inward position to a radially outward position upon application of a centrifugal force above a threshold level, the clutch shoes arranged to contact an interior surface of the drum at the outward position, each clutch shoe including a spring cavity;
    a spring and damper assembly located within each spring cavity, the spring and damper assembly comprising:
    a spring having two opposed ends;
    a spring retainer located within the spring cavity and positioned against one of the ends of the spring, the spring retainer engaged with the clutch hub and configured to locating the spring within the spring cavity; and
    a dampener located within the spring, the dampener comprising a material that reduces motion of the spring.

12. The spring and damper assembly of claim 11, wherein the spring retainer includes a protrusion that extends toward and into an inner diameter of the spring for locating the spring relative to the protrusion.

13. The centrifugal clutch of claim 11, wherein the dampener comprises an elastomer material.

14. The centrifugal clutch of claim 13, wherein the elastomer is a rubber or a silicone-based material.

15. The centrifugal clutch of claim 13, wherein the dampener has an outer diameter that is less than or equal to an inner diameter of the spring.

16. The centrifugal clutch of claim 15, wherein the dampener has an outer diameter that is between about 0.1% and about 5% less than the inner diameter the spring.

17. The centrifugal clutch of claim 15, wherein the spacing between the outer diameter of the dampener and the inner diameter of the spring is between about 0.001 and about 0.004 inches.

18. The centrifugal clutch of claim 13, wherein the dampener has a length that is less than an installed length of the spring and greater than about one-half of the installed length of the spring.

19. The centrifugal clutch of claim 11, wherein the dampener comprises a foam material.

20. The centrifugal clutch of claim 19, wherein the foam material is selected from a group consisting of a viscoelastic polyurethane, a polyvinyl chloride foam, a low resilience polyurethane foam, and an open cell foam.

* * * * *